United States Patent
Zickefoose

(10) Patent No.: US 7,150,382 B2
(45) Date of Patent: Dec. 19, 2006

(54) ATTACHMENT TO MOTORCYCLE TO SAFELY TRANSPORT MUSICAL INSTRUMENTS

(76) Inventor: Mark S. Zickefoose, 282 Dausman Park, Clarksville, MI (US) 48815

( * ) Notice: Subject to any disclaimer, the term of this patent is extended or adjusted under 35 U.S.C. 154(b) by 551 days.

(21) Appl. No.: 10/730,084

(22) Filed: Dec. 9, 2003

(65) Prior Publication Data

US 2005/0121482 A1 Jun. 9, 2005

(51) Int. Cl.
*B62J 7/04* (2006.01)
(52) U.S. Cl. ............... 224/423; 224/431; 224/450; 224/459; 224/910
(58) Field of Classification Search ........... 224/282, 224/413, 419, 423, 430, 431, 441, 450, 458–462, 224/910; 206/314
See application file for complete search history.

(56) References Cited

U.S. PATENT DOCUMENTS

| | | | |
|---|---|---|---|
| 3,938,719 A | | 2/1976 | Carlton |
| 5,558,260 A | | 9/1996 | Reichert |
| 5,667,232 A | * | 9/1997 | Gogan et al. ............. 280/202 |
| D387,326 S | * | 12/1997 | Ingram ..................... D12/407 |
| 6,293,450 B1 | * | 9/2001 | Aron ....................... 224/430 |
| 6,347,804 B1 | * | 2/2002 | Seibel ..................... 280/288.4 |
| 6,484,914 B1 | | 11/2002 | Willey |
| 6,491,193 B1 | | 12/2002 | Dudek et al. |
| 6,505,765 B1 | * | 1/2003 | Proctor et al. ............ 224/413 |
| 2002/0038745 A1 | * | 4/2002 | Lamming ................. 190/125 |
| 2003/0057242 A1 | | 3/2003 | Schurr |
| 2003/0066854 A1 | | 4/2003 | Heinrich et al. |

* cited by examiner

*Primary Examiner*—Nathan J. Newhouse
*Assistant Examiner*—Corey N. Skurdal
(74) *Attorney, Agent, or Firm*—Richard C. Litman

(57) ABSTRACT

A bracket system for mounting and dismounting a musical instrument case to a motorcycle and includes two grooved mounting posts and a mounting spool attached to the frame, rear fender, or rear fender rail of the motorcycle, and a bracket system mounted on the musical instrument case to removably receive the mounting posts and spool. The system has a first bracket having an end-located post receiver groove and a vertical post receiver groove opening downward for engaging the two posts. By sliding the end-located post receiver groove over the forward post followed by rotational engagement of the rearward post by the downward opening post receiver groove of the second bracket the case is installed on the posts.

The system also has a second bracket mounted on the case having an upward-opening spring biased quick-release docking latch so mounted as to securely engage and disengage a spool mounted on the motorcycle.

18 Claims, 9 Drawing Sheets

ATTACHMENT TO MOTORCYCLE TO SAFELY TRANSPORT MUSICAL INSTRUMENTS

BACKGROUND OF THE INVENTION

1. Field of the Invention

The present invention relates to motorcycle mounting brackets. More particularly, the present invention relates to a system for safely transporting a guitar or the like having a quick-release bracket for attachment to a motorcycle.

2. Description of the Related Art

The use of quick-release brackets for mounting various items on a motorcycle is known. Such brackets are particularly useful for saddlebags, seat supports or the like and may be mounted to the rear frame or a fender bar. The carrying of bulky musical instruments is a challenge when a motorcycle is used, leading to instrument damage and safety concerns by the rider. The musical instrument is preferably carried in a case for protection and ease in carrying, during both transportation and hand carrying to the location of use. It would be desirable to provide a quick-release bracket and mountings for effective mounting and easy dismounting of a musical instrument case while safely carrying a musical instrument inside the case.

U.S. Patent Publication No. 2003/0057242 B1, published Mar. 27, 2003, for Schurr, describes a motorcycle golf bag carrier used in conjunction with a saddlebag mounting system to connect and transport a user's golf bag on a motorcycle. The carrier is vertically attached to the side of a motorcycle by means of frame-mounted brackets.

U.S. Pat. No. 3,938,719, issued Feb. 17, 1976, to Carlton, describes a storage device for motorcycles and like vehicles. This storage device is used for transporting goods such as sporting equipment and grocery parcels, etc. The device includes a container for goods and an attachment system for detachably securing the container to a motorcycle.

U.S. Pat. No. 5,558,260, issued Sep. 24, 1996, to Reichert, describes a quick-release type mounting for attachment of a passenger seat rack having a rotating bracket engaging a support post mounted on a rear side frame of a motorcycle.

U.S. Pat. No. 6,484,914 B1, issued Nov. 26, 2002, to Wiley, describes a mounting system for an accessory where latching frames are connected to fender rails or the like by two posts. On each side of the motorcycle, a lateral groove of the latching frames first engages a front post on the fender rail and the latching frames rotated downward such that a vertical groove engages a rear post.

U.S. Pat. No. 6,293,450B1, issued Sep. 25, 2001 to Aron, describes a motorcycle fender rail having quick-release posts for attachment of a bracket bearing a saddlebag.

U.S. Pat. No. 6,491,193, issued Dec. 10, 2002, to Dudek et al., describes a motorcycle luggage accessory. This device is a lumbar support and is removably secured longitudinally, laterally, and vertically to the back of a motorcycle. This luggage accessory serves as a backrest for the rider and as well as a means for storing personal effects.

None of the above inventions and patents, taken either singly or in combination, is seen to describe the instant invention as claimed. Thus, an attachment to a motorcycle to safely transport musical instruments solving the aforementioned problems is desired.

SUMMARY OF THE INVENTION

The present invention is a bracket system for safely and securely mounting a musical instrument case to a motorcycle and allowing for ease of dismounting the case upon arrival at a location of instrument use or storage. The inventive system includes two grooved mounting posts and a mounting spool attached to the frame, rear fender, or rear fender rail of the motorcycle, and a bracket system mounted on the musical instrument case to removably receive the mounting posts and spool.

The two mounting posts are mounted horizontally along the length of the frame or fender, one being forward mounted and the other being rearward mounted. The system has a first bracket having an end-located post receiver groove and a vertical post receiver groove opening downward for engaging the two posts. By sliding the end-located post receiver groove over the forward post followed by rotational engagement of the rearward post by the downward opening post receiver groove of the second bracket the case is installed on the posts.

The system also has a second bracket mounted at a location on the same side of the case and spaced forward of the first bracket, the second bracket having an upward-opening spring biased quick-release docking latch so mounted as to securely engage and disengage a spool mounted on the motorcycle. In a preferred embodiment, the two grooved posts are screw-mounted to the rear frame of the motorcycle, while the spool is mounted to the frame at a location proximate the rear of the motor via a front bracket support extending between the frame and the spool mounting point. The length and location of mounting of the front bracket support is determined by the configuration of the particular motorcycle. The second bracket is located forward on the instrument case relative to the first bracket as mounted on the corresponding spool and grooved posts, respectively. The case is removed by releasing the spring biased docking latch, rotating the case around the forward mounted grooved post so as to disengage the first and second brackets from their respective spool and rearward post, and lifting the case up and away from the forward post and the motorcycle.

Accordingly, it is a principal object of the invention to provide a system for securely carrying a musical instrument or the like on a motorcycle.

It is another object of the invention to provide a system as above having a bracket system for mounting and dismounting a musical instrument case holding and instrument therein.

It is another object of the invention to provide a system as above having a quick-disconnect feature for secure mounting and easy, quick-disconnect of the instrument case relative to the motorcycle.

It is a further object of the invention to provide a system as above having grooved mounting posts and a mounting spool inconspicuously mounted on the motorcycle for receiving a bracket system mounted on a side of the instrument case.

Still another object of the invention is to provide a system as above having spring loaded quick-disconnect latch mounted on a forward portion of the instrument case as mounted.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a bracket system for safely and securely mounting a musical instrument case to a motorcycle and allowing for ease of dismounting the case upon arrival at a location of instrument use or storage.

Figure 1:
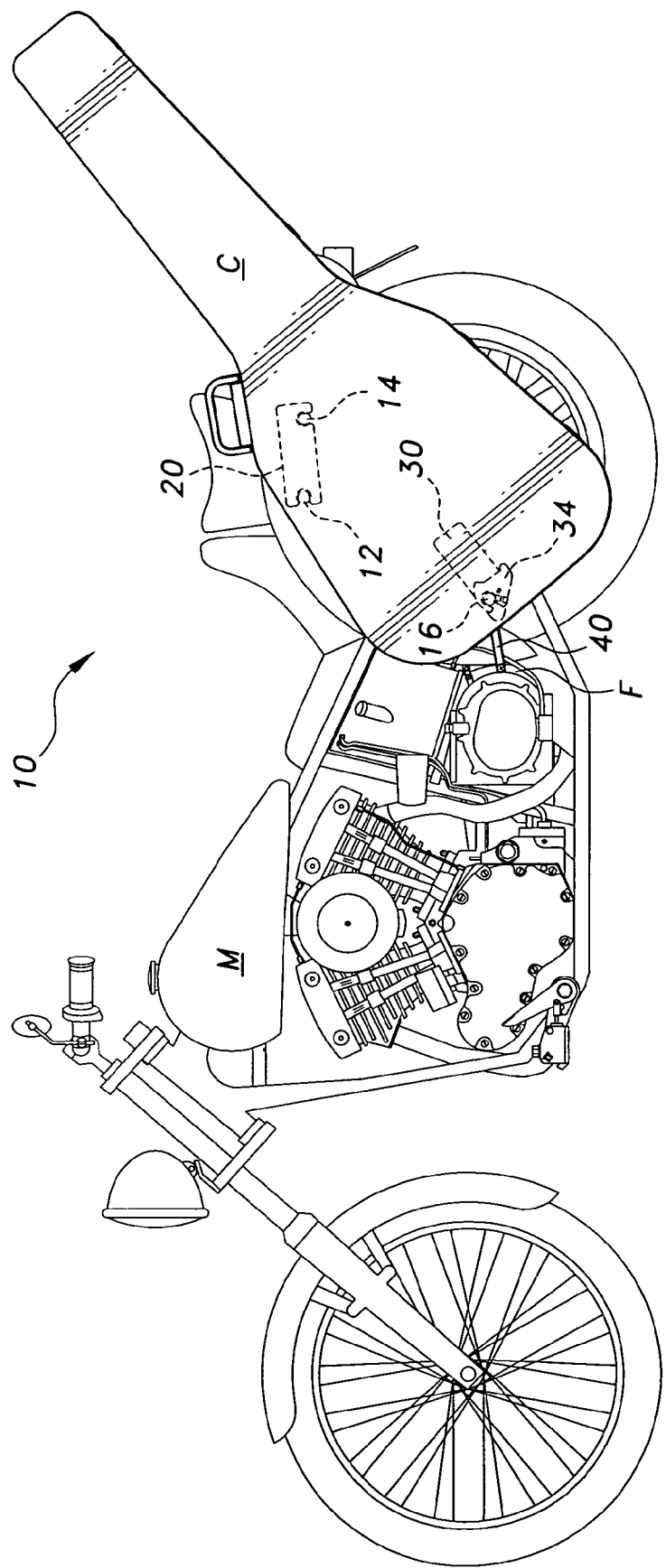
FIG. 1 is an environmental, perspective view of the musical instrument case as mounted to motorcycle to safely transport musical instruments according to the present invention.

Referring to the Figures, the quick-release bracket system for mounting a musical instrument case or the like for safe, secure transport of a musical instrument on a motorcycle generally referred to by the reference number 10. As seen in FIG. 1, case C is in the form of a guitar and is mounted to the frame F of motorcycle M at its rear portion. First mounting bracket 20 is engaged with front mounting post 12 and rear mounting post 14 which are, in turn mounted to the rear frame or fender of motorcycle M (see FIG. 3).

Second bracket 30 is spaced forward of and generally downward from first bracket 20 having quick-disconnect docking latch 34 engaging mounting spool 16 attached to the rear end portion of front lower bracket support 40. Lower bracket support is attached to frame F of motorcycle M at a convenient point to the rear of the transmission of the motorcycle. The location of the first bracket 20, the second bracket 30, and the point of attachment of lower bracket support 40 on a motorcycle M may vary depending upon the configuration of the particular motorcycle used.

In differing applications, bracket support 40 may not be necessary as the mounting spool 16 could be otherwise attached to the motorcycle. Similarly, it is possible that bracket supports similar to bracket support 40 may be necessary as intermediate structure for supporting front mounting post 12 and rear mounting post 14. Such configurations should be considered to be within the scope of the present invention.

Figure 2:
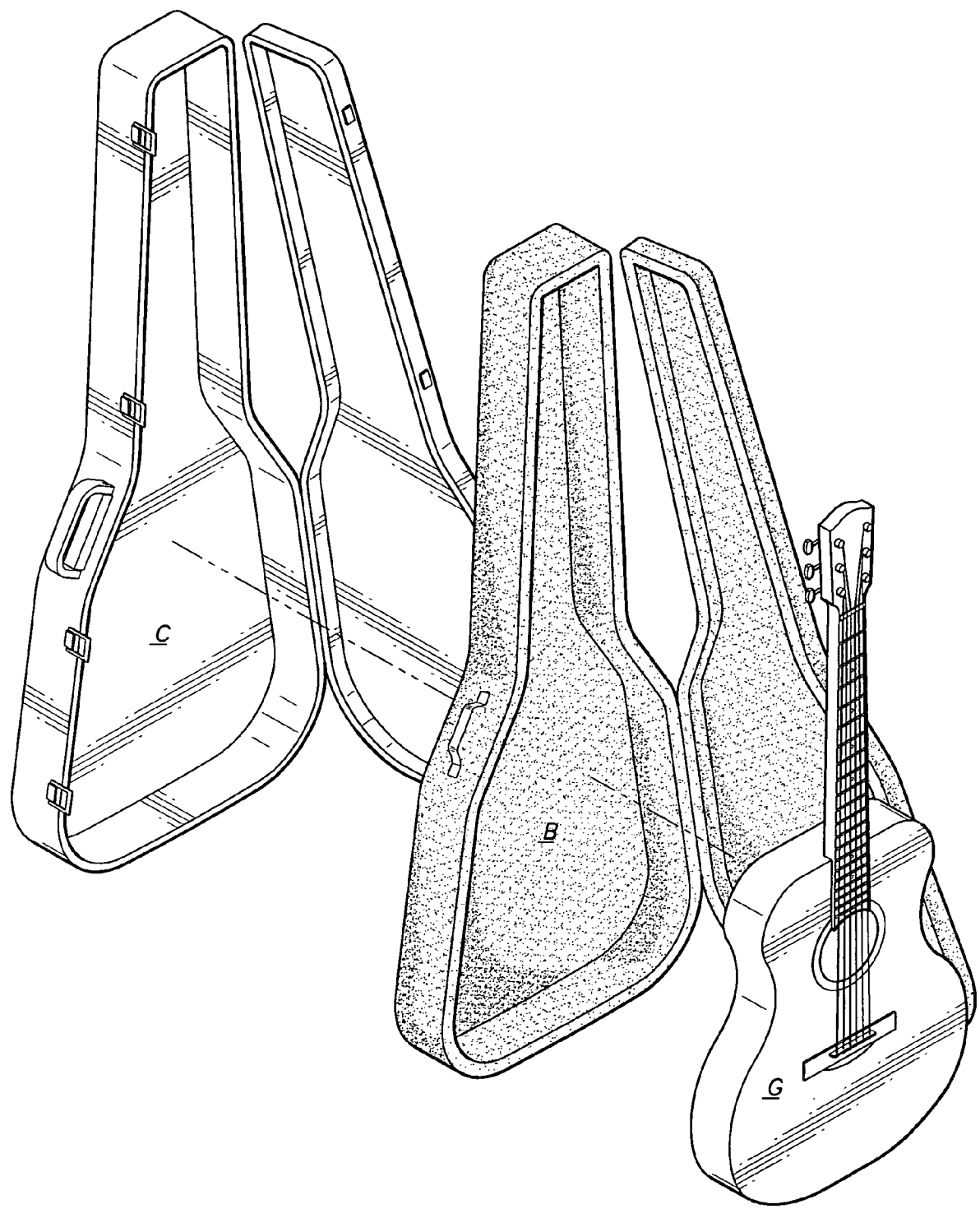
FIG. 2 is an exploded view of the instrument case of FIG. 1, showing the instrument and protective bag for installation of the instrument within the case.

As illustrated in FIG. 2, a musical instrument G such as a guitar may be placed in a protective bag B made of a cushioning material such as foam material and placed for transport and storage in case C.

Figure 3:
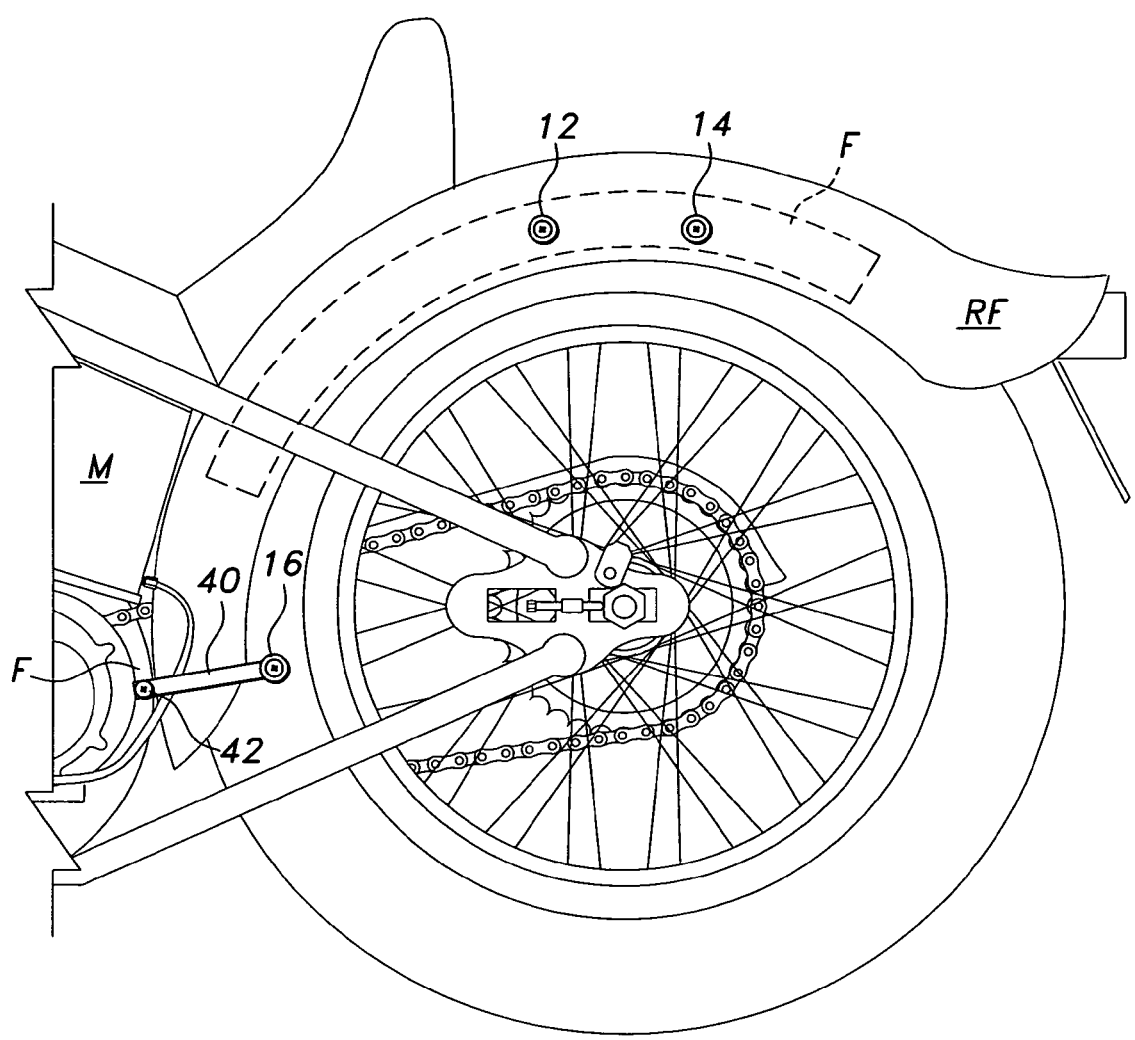
FIG. 3 is a side elevation view of the rear portion of a motorcycle showing the grooved mounting posts and mounting spool of the system of FIG. 1 as mounted to the motorcycle.
Figure 4:
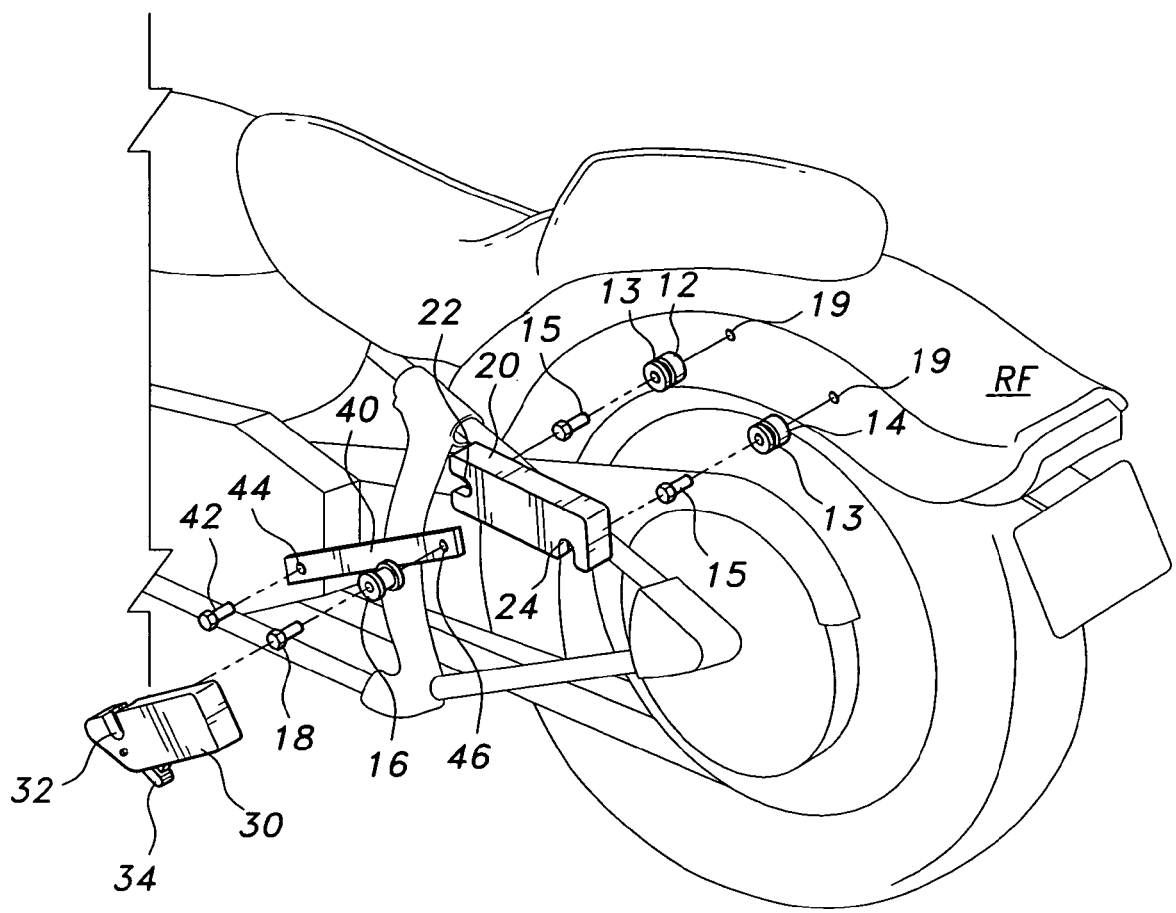
FIG. 4 is an exploded view of the mounting posts, mounting spool, front bracket support, and first and second mounting brackets of FIG. 1 as exploded away from the rear portion of a motorcycle.

Referring to FIGS. 3 and 4, there is shown a side elevation and an exploded view of the hardware mountings and engaging brackets, respectively. The engaging brackets may be attached to the back of the case C by gluing, fasteners, or a combination thereof. Mounting posts 12 and 14 are of chrome plated or stainless steel and have circumferential grooves 13 therein for receiving first bracket 20. The grooves are preferably lined with elastomeric material having high impact qualities for quiet and snug fit. Posts 12 and 14 are attached by screws 15 (not to scale) to frame F through rear fender RF by means of holes 19, bored therethrough. Alternatively, posts 12 and 14 may be directly attached to rear fender RF in a similar manner.

Front end groove 22 of first bracket 20 receives forward post 12 upon mounting and then the bracket is rotated downward, downward opening vertical groove 24 receiving rear post 14, forming a stable mounting for first bracket 20 and the back of case C attached thereto. Lower front bracket support 40 is in the form of an elongated flat or strut, mounted to frame F by mounting bolt 42 at frame throughbore 44. Bolts and screws may be received in frame F in tapped bores, or appropriately positioned threaded nuts (not shown). The mounting spool 16 is made of chrome plated or stainless steel and is mounted to the free end of bracket support 40 by spool mounting screw 18 affixed in receiving bore 46. Second mounting bracket 30 is mounted by fasteners (not shown) to the forward back portion of case C with upward opening post receiving groove 32 having quick-release, spring biased latch 34 attached for engagement with mounting post 16.

Figure 5:
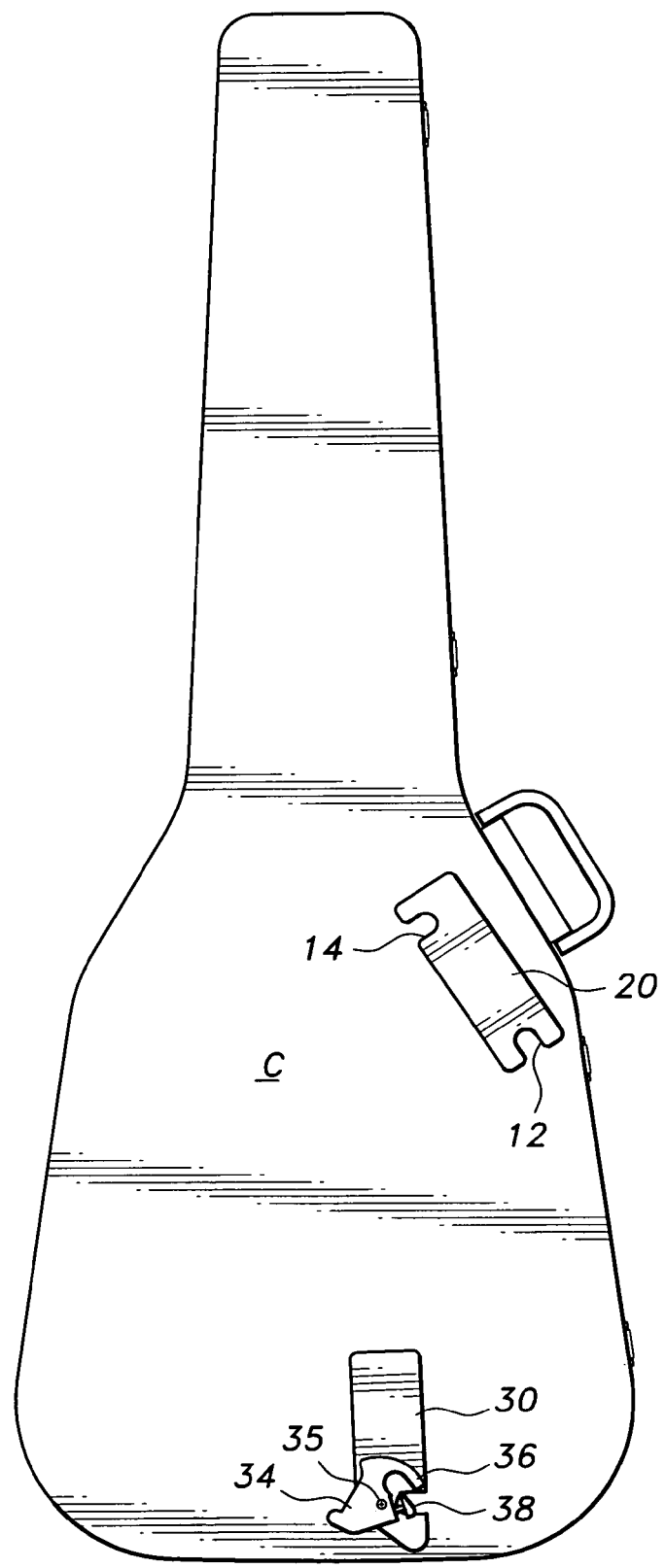
FIG. 5 is a side elevation view of a musical instrument case of FIG. 1 with first and second mounting brackets mounted on one side of the case.
Figure 6A:
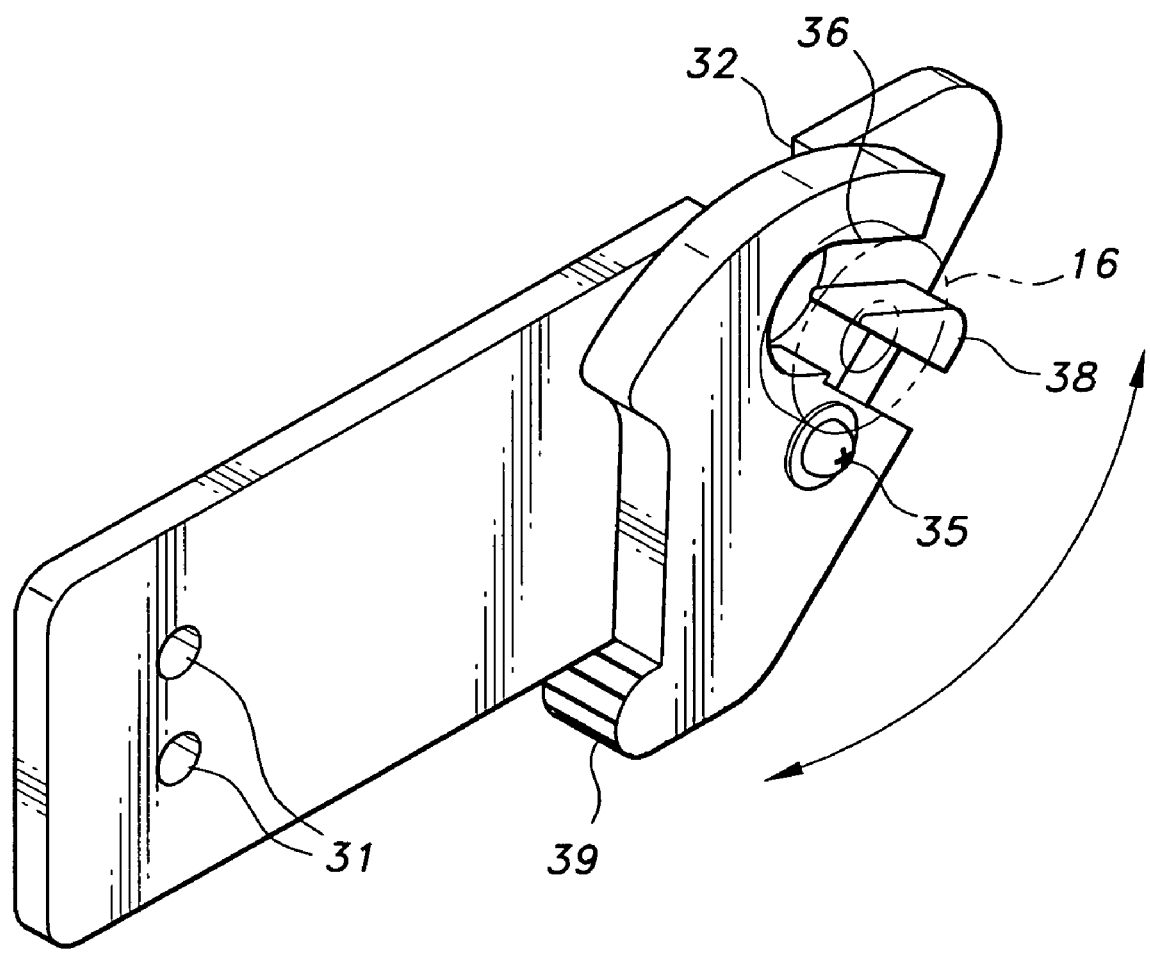
FIG. 6A is a perspective view of the first mounting bracket and spring loaded quick-disconnect latch of FIG. 1, the latch shown in a closed position over the spool.
Figure 6B:
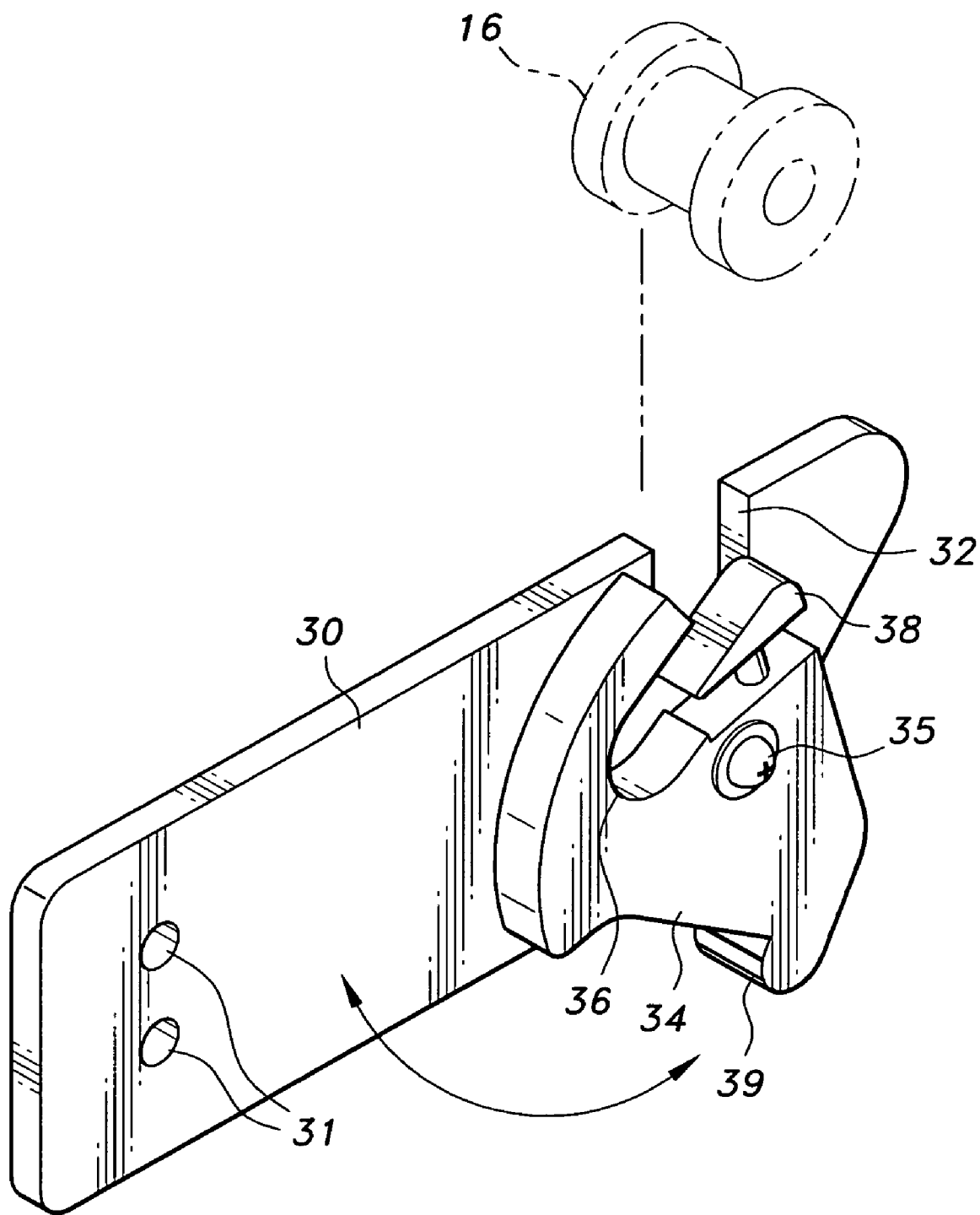
FIG. 6B is a perspective view of the first mounting bracket and spring loaded quick-disconnect latch of FIG. 1, the latch shown in the open position with the spool exploded away.

As best seen in FIGS. 5, 6A, and 6B there is illustrated the second bracket 30 attached to the back of case C near the base, thereof. Second bracket 30 has mounting bores 31 for fasteners (not shown) mounting bracket 30 to case C. A spacer (not shown) may be placed between bracket 30 and the back wall of case C to allow space to receive the free end of mounting spool 16. Docking latch 34 has a main body mounted on pivot 35 for rotation between an open and closed position. Docking latch 34 has an upward opening groove 36 having a spring biased latch member 38 for securing spool 16 in groove 36 (see FIG. 6A). Docking latch 34 has a release crank 39 extending below the lower edge of bracket 30 having knurls to receive the user's thumb or finger to rotate latch 30 to an open position releasing spool 16 (see FIG. 6B). The docking latch 34 is commercially available, having Harley-Davidson Part No. 553542-95. The mounting posts 12 and 14, and the mounting spool 16 are also common Harley-Davidson parts, made of stainless or chrome steel and a hard plastic.

Figure 7:
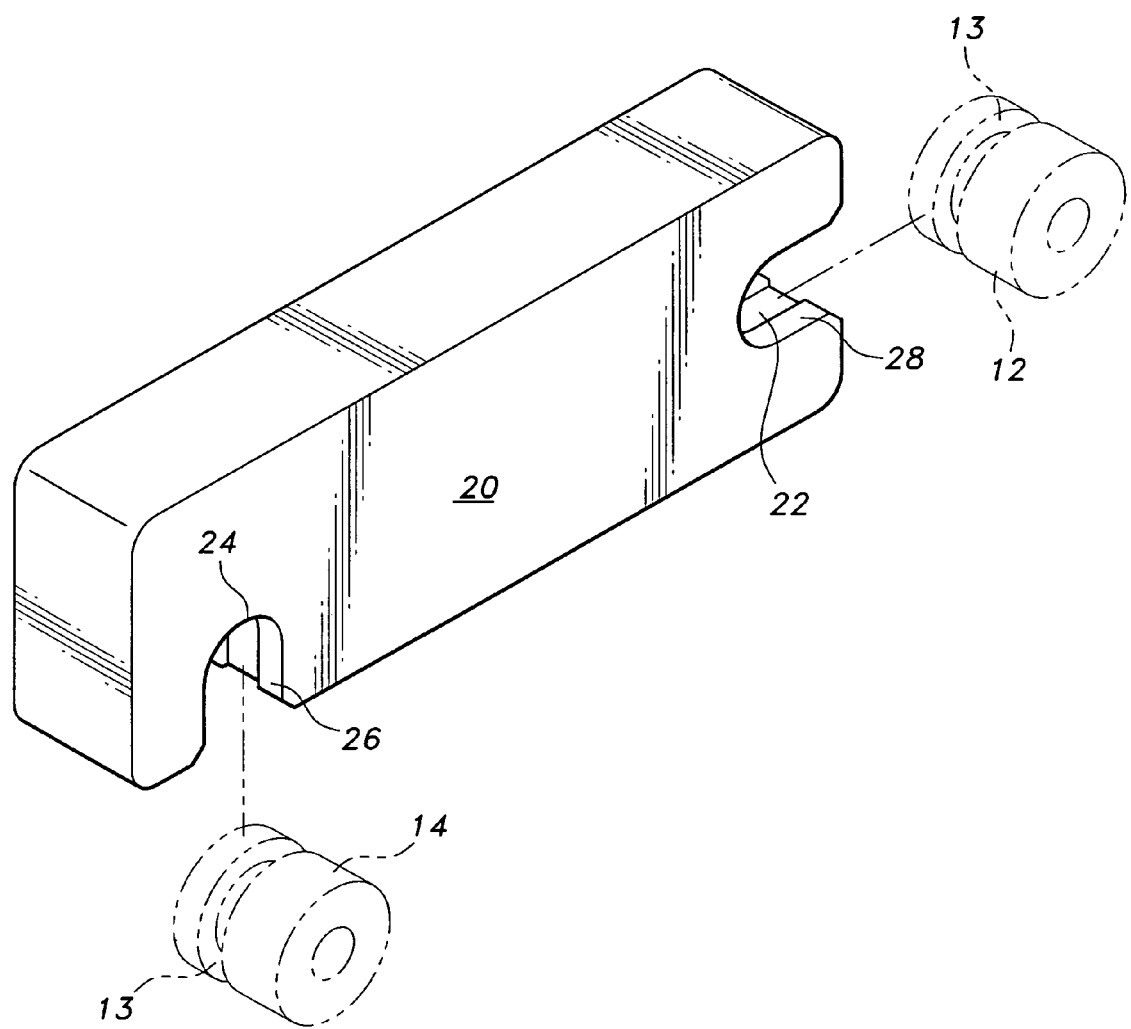
FIG. 7 is a perspective view of the second mounting bracket of FIG. 1 having lateral and downward opening grooves with the grooved posts exploded away.

Referring particularly to FIGS. 5 and 7, first bracket 20 is attached to the back of case C by gluing or other means (not shown) and has a generally downward post receiving slot 24 having a retaining rim 26 which is received in the slot 13 of rear mounting post 14. A forward end groove 22 has a retaining rim 28 for receiving the slot 13 of forward post 12.

Figure 8:
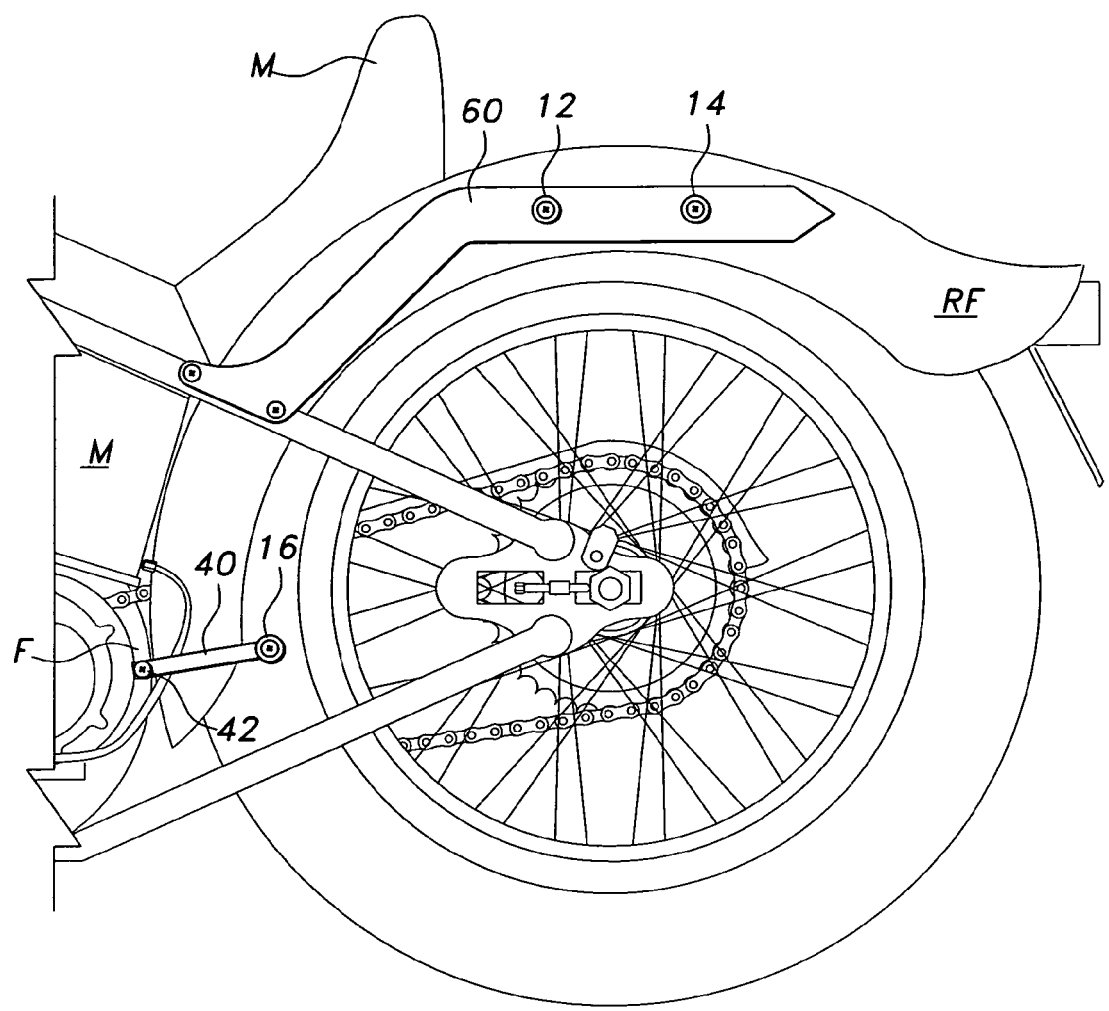
FIG. 8 is a side elevation view similar to that of FIG. 3 where the mounting posts are mounted on a fender rail.

Referring to FIG. 8, there is shown mounting posts 12 and 14 mounted on a fender rail R attached to frame F for receiving first bracket 20. In this embodiment, the bracket 20 may be mounted lower on the back of case C as appropriate. Fender rail RF is a common motorcycle part made of chrome steel or stainless steel.

The mounting bracket 20 is preferably made of high-impact plastic and mounted on the back of case C by adhesive in a known manner. In a production model the bracket 20 may be molded as part of the case C. The mounting bracket 30 is preferably made of stainless steel or chrome steel. The lower bracket support 40 is preferably made of stainless steel or chrome steel. Fasteners are preferably made of stainless steel.

It is to be understood that the present invention is not limited to the embodiments described above, but encompasses any and all embodiments within the scope of the following claims.

I claim:

1. A motorcycle attachment system attachable to a motorcycle having a frame to safely transport musical instruments comprising:
   an instrument case;
   a first bracket attached to said instrument case at a back side thereof;
   a second bracket attached to said instrument case at a point spaced forward from said first bracket;
   a first and a second spaced mounting post, each having a free end, said first post mounted forward of second post, said mounting posts being mounted to said motorcycle in the vicinity of the upper portion of the rear tire thereof;
   a mounting spool having a free end, said mounting spool being mounted to the frame of said motorcycle at a point in the vicinity of the rear wheel of said motorcycle;
   said first bracket having a forward opening groove for receiving said first mounting post;
   said first bracket having a downward opening groove for receiving said second mounting post;
   said second bracket having an upward opening groove for receiving said mounting spool;
   said second bracket having a spring-biased latch so located on said second bracket as to removably retain said mounting spool within said upward opening groove.

2. The motorcycle attachment system of claim 1, wherein said first and said second spaced mounting posts are mounted on a rear portion of said frame.

3. The motorcycle attachment system of claim 1, wherein said first and said second spaced mounting posts are mounted by means of mounting screws extending through corresponding apertures in the rear fender of said motorcycle.

4. The motorcycle attachment system of claim 1, wherein said first and said second spaced mounting posts are mounted on the rear fender of said motorcycle.

5. The motorcycle attachment system of claim 1, wherein said motorcycle has a fender rail attached to a portion of said frame, said fender rail extending along the upper portion of a rear fender, said first and said second mounting posts being mounted on said fender rail.

6. The motorcycle attachment system of claim 1, wherein said mounting spool is mounted to said frame by means of a spacing front bracket support extending between the said frame and said spool mounting point.

7. The motorcycle attachment system of claim 6, wherein said front bracket support is a steel flat member having a forward end and a rearward end, said forward end being removably bolted to said frame at a point to the rear and in the vicinity of the transmission of said motorcycle, said rearward end bearing said mounting spool.

8. The motorcycle attachment system of claim 1, wherein said first and second spaced mounting posts have circumferential attachment grooves spaced from their free ends, respectively.

9. The motorcycle attachment system of claim 8, wherein said first mounting bracket has a retaining rim at the inward side of said forward opening groove, said retaining rim engaging said circumferential groove of said first mounting post.

10. The motorcycle attachment system of claim 9, wherein said first mounting bracket has a retaining rim at the inward side of said downward opening groove, said retaining rim engaging said circumferential groove of said second mounting post.

11. The motorcycle attachment system of claim 1, wherein said case is a rigid case having a removable liner bag for receiving an instrument therein.

12. The motorcycle attachment system of claim 11, wherein said liner bag comprises cushioning foam.

13. The motorcycle attachment system of claim 12, wherein said instrument case is adapted for carrying a guitar.

14. The motorcycle attachment system of claim 1, wherein said spring-biased docking latch of said second mounting bracket is rotatively mounted between an open position and a closed position and on the inward side of said second mounting bracket adjacent said upward opening mounting spool receiving groove such that said spring-biased latch may releasably engage and retain said mounting spool within said upward opening groove.

15. The motorcycle attachment system of claim 14, wherein said docking latch has an upward opening groove having a spring-biased latch member for retaining said spool when said latch member is rotated to said closed position and releasing said spool when said latch body is rotated to and open position.

16. The motorcycle attachment system of claim 15, wherein said latch member has a release crank extending below said second bracket for rotating said docking latch between a closed position and an open position.

17. The motorcycle attachment system of claim 16, wherein said release crank is knurled for ease in hand disengagement of said mounting spool by the user.

18. The motorcycle attachment system of claim 17, wherein said mounting spool and said second mounting post are so located relative to said first bracket and said second bracket such that when said case is supported on said first mounting post by said first bracket and within said forward end opening groove, said second mounting post engages said downward opening groove of said first bracket and said mounting post engages said upward opening groove of said second bracket while being retained by said upward opening latch of said spring-biased docking latch.

* * * * *